United States Patent
Zhang et al.

(10) Patent No.: US 11,064,464 B2
(45) Date of Patent: Jul. 13, 2021

(54) RESOURCE CONFIGURATION METHOD AND APPARATUS

(71) Applicant: HUAWEI TECHNOLOGIES CO., LTD., Guangdong (CN)

(72) Inventors: Xu Zhang, Beijing (CN); Lixia Xue, Beijing (CN); Bingyu Qu, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 129 days.

(21) Appl. No.: 16/436,227

(22) Filed: Jun. 10, 2019

(65) Prior Publication Data

US 2019/0297616 A1    Sep. 26, 2019

Related U.S. Application Data

(63) Continuation of application No. PCT/CN2017/115053, filed on Dec. 7, 2017.

(30) Foreign Application Priority Data

Dec. 31, 2016 (CN) .......................... 201611261986.3

(51) Int. Cl.
    *H04W 72/04*     (2009.01)
(52) U.S. Cl.
    CPC ....... *H04W 72/0406* (2013.01); *H04W 72/04* (2013.01)
(58) Field of Classification Search
    None
    See application file for complete search history.

(56) References Cited

U.S. PATENT DOCUMENTS

| 2011/0081871 A1 | 4/2011 | Molnar |
| 2011/0243090 A1 | 10/2011 | Grovlen et al. |
| 2014/0016622 A1 | 1/2014 | Bao et al. |

(Continued)

FOREIGN PATENT DOCUMENTS

| CN | 102246553 A | 11/2011 |
| CN | 102668645 A | 9/2012 |

(Continued)

OTHER PUBLICATIONS

Ericsson, "Summary of e-mail discussions on downlink control signaling," TSG-RAN WG1 #87, R1-1612908, Reno, NV, USA, Nov. 14-18, 2016, 37 pages.

(Continued)

*Primary Examiner* — Jenkey Van
(74) *Attorney, Agent, or Firm* — Fish & Richardson P.C.

(57) ABSTRACT

A resource configuration method and apparatus are provided. In an example implementation, the method includes: receiving, by a terminal, indication information, where the indication information indicates a subcarrier width used for a first control channel, a maximum quantity of symbols occupied by the first control channel is determined based on the subcarrier width, and the different subcarrier widths correspond to different maximum symbol quantities; and determining, by the terminal based on the indication information, a quantity of symbols occupied by the first control channel, where the quantity of symbols occupied by the first control channel is less than or equal to the maximum quantity of symbols.

14 Claims, 6 Drawing Sheets

(56) References Cited

U.S. PATENT DOCUMENTS

| | | | |
|---|---|---|---|
| 2015/0139126 A1 | 5/2015 | Park et al. | |
| 2015/0223215 A1 | 8/2015 | Kim et al. | |
| 2016/0014762 A1 | 1/2016 | Ji et al. | |
| 2016/0135185 A1 | 5/2016 | Chandrasekhar et al. | |
| 2016/0261328 A1 | 9/2016 | Kim et al. | |
| 2016/0352551 A1 | 12/2016 | Zhang et al. | |
| 2018/0054292 A1* | 2/2018 | Yang | H04L 5/0091 |
| 2018/0098312 A1* | 4/2018 | Lin | H04L 5/0007 |
| 2019/0357303 A1* | 11/2019 | Xiong | H04W 56/001 |
| 2019/0372721 A1* | 12/2019 | Lee | H04L 1/1864 |
| 2020/0322199 A1* | 10/2020 | Matsumura | H04L 5/0048 |

FOREIGN PATENT DOCUMENTS

| | | |
|---|---|---|
| CN | 105827383 A | 8/2016 |
| WO | 2013023290 A1 | 2/2013 |
| WO | 2016004634 A1 | 1/2016 |
| WO | 2016004900 A1 | 1/2016 |

OTHER PUBLICATIONS

Office Action issued in Japanese Application No. 2019-533619 dated Aug. 31, 2020, 5 pages (with English translation).

Intel Corporation,"PRACH Transmission for eLAA" Abstact, Presented at R1-164131 3GPP TSG RAN WG1 Meeting #85 R1-164131,Nanjing, China, May 23-27, 2016, 3 pages.

PCT International Search Report and Written Opinion in International Application No. PCT/CN2017/115053, dated Feb. 24, 2018, 9 pages (With English translation).

ZTE Microelectronics,"NR DL Control Channel Structure" Abstract, Presented at R1-1611292 3GPP TSG RAN WG1 Meeting #87,Reno, USA Nov. 14-18, 2016, 8 pages.

Convida Wireless, "Discussion on Dynamic Switching of Transmission Modes," 3GPP TSG RAN WG1 Meeting #86bis, Lisbon, Portugal, Oct. 10-14, 2016, R1-1610380, 3 pages.

Nokia et al., "Unified MIMO transmission mode for 5G new radio interface," 3GPP TSG-RAN WG1#86, Gothenburg, Sweden, Aug. 22-26, 2016, R1-167285, 3 pages.

Extended European Search Report issued in European Application No. 17888964.8 dated Nov. 12, 2019, 12 pages.

Guangdong OPPO Mobile Telecom,"Downlink control channel design consideration",3GPP TSG RAN WG1 Meeting #87, R1-1611704, Reno, USA, Nov. 14-18, 2016, 5 pages.

Office Action issued in Chinese Application No. 201611261986.3 dated Mar. 4, 2020, 12 pages (With English Translation).

* cited by examiner

RESOURCE CONFIGURATION METHOD AND APPARATUS

CROSS-REFERENCE TO RELATED APPLICATIONS

This application is a continuation of International Application No. PCT/CN2017/115053, filed on Dec. 7, 2017, which claims priority to Chinese Patent Application No. 201611261986.3, filed on Dec. 31, 2016 The disclosures of the aforementioned applications are hereby incorporated by reference in their entireties.

TECHNICAL FIELD

This application relates to the field of communications technologies, and in particular, to a resource configuration method and apparatus.

BACKGROUND

A long term evolution (Long Term Evolution, LTE) system standard specified by the 3rd generation partnership project (the 3rd Generation Partnership Project, 3GPP) is considered as a fourth generation wireless access system standard. In an existing LTE system, a control channel includes two types: a physical downlink control channel (Physical Downlink Control Channel, PDCCH) and an enhanced physical downlink control channel (Enhanced Physical Downlink Control Channel, EPDCCH). In time domain, a time-frequency resource region of the PDCCH is located in first 0 to 3 orthogonal frequency division multiplexing (Orthogonal Frequency Division Multiplexing, OFDM) symbols of a subframe, and a time-frequency resource region of the EPDCCH occupies all downlink OFDM symbols in the subframe except those for the PDCCH. In frequency domain, a time-frequency region of the PDCCH occupies an entire system bandwidth, and a time-frequency region of the EPDCCH occupies a frequency-domain width of at least one physical resource block (Physical Resource Block, PRB) in frequency domain.

In the prior art, a size of a time-frequency resource of a PDCCH is indicated by indication information carried in a physical control format indicator channel (Physical Control Format Indicator Channel, PCFICH) channel and system broadcast information carried in a PBCH channel, and the PCFICH channel carries two bits of indication information used to indicate only a quantity of OFDM symbols occupied in time domain by the time-frequency resource region of the PDCCH, and there are usually 0 to 3 OFDM symbols. A frequency-domain size of the time-frequency resource of the PDCCH is indirectly indicated by system broadcast information carried in a physical broadcast channel (Physical Broadcast Channel, PBCH). Because it is predefined in the standard that a frequency-domain size of a region of a PDCCH is equal to a system bandwidth size, indication information that indicates the system bandwidth size and that is carried in the PBCH channel may be used to indirectly indicate the frequency-domain size of the region of the PDCCH. The system bandwidth size includes {1.4 MHz, 3 MHz, 5 MHz, 10 MHz, 15 MHz, 20 MHz}, and a master information block (master information block, MIB) includes 3-bit information used to indicate the system bandwidth size; and the frequency-domain size of the PDCCH may also be obtained based on the 3-bit information.

A size of a frequency-domain resource of an EPDCCH is indicated by using higher-layer signaling (for example, RRC signaling). The higher-layer signaling indicates a subframe of the EPDCCH and a frequency-domain location of a PRB occupied by the EPDCCH. The PRB may occupy a series of consecutive frequency-domain resources, or may occupy a plurality of inconsecutive PBR resource blocks in frequency domain. The time-domain subframe of the EPDCCH is a subframe predefined in the standard (for example, a subframe for a non-multicast channel or a non-special subframe under some radio frame configurations), and a quantity of OFDM symbols occupied in time domain by the EPDCCH also needs to be adjusted based on received indication information of a PCFICH channel, that is, the time domain resource occupied by the EPDCCH is orthogonal to a time-frequency resource of the PDCCH.

In a next-generation wireless communications system, for example, in NR (New Radio), a system supports a plurality of subcarrier widths, for example, 15 kHz, 30 kHz, 60 kHz, and 120 kHz, and a ratio of any two subcarrier widths is equal to 2n, where n=−N, . . . , −2, −1, 1, 2, . . . , or N. A time-frequency resource of a control channel may use one or more of the plurality of subcarrier widths, and the subcarrier widths may be predefined or preconfigured. In this case, when a time-domain location of the control channel is unchanged, but a subcarrier width used for the control channel changes, for example, from 15 kHz to 30 kHz, a quantity of OFDM symbols included in a region for the control channel increases; if a PCFICH is used, a maximum quantity of OFDM symbols that is indicated by the PCFICH is less than a quantity of OFDM symbols that can be used by the system currently; consequently, a terminal cannot identify the frequency-domain region for the control channel except the three OFDM symbols indicated. Therefore, how the terminal determines the time-frequency resource occupied by the control channel becomes a problem to be resolved urgently.

SUMMARY

Embodiments of this application provide a resource configuration method and apparatus, so that a terminal can determine a time-frequency resource occupied by a control channel, thereby increasing resource utilization.

According to a first aspect, an embodiment this application provides a resource configuration method, including:

receiving, by a terminal, indication information, where the indication information is used to indicate a subcarrier width used for a first control channel, a maximum quantity of symbols occupied by the first control channel is determined by the subcarrier width, and the different subcarrier widths correspond to different maximum symbol quantities; and determining, by the terminal based on the indication information, a quantity of symbols occupied by the first control channel, where the quantity of symbols occupied by the first control channel is less than or equal to the maximum quantity of symbols.

According to the method provided in this embodiment of this application, after receiving the indication information, the terminal may determine the subcarrier width used for the first control channel, and then determine, based on the maximum quantity of symbols that corresponds to the subcarrier width used for the first control channel, the quantity of symbols occupied by the first control channel, to determine a time-frequency resource occupied by the first control channel. In this way, the terminal can quickly determine information carried in the first control channel and quickly access a network, thereby increasing resource utilization.

Optionally, the subcarrier width includes a first subcarrier width and a second subcarrier width, and the maximum quantity of symbols occupied by the first control channel includes a first maximum symbol quantity and a second maximum symbol quantity, where the first maximum symbol quantity corresponds to the first subcarrier width, and the second maximum symbol quantity corresponds to the second subcarrier width; and that the different subcarrier widths correspond to different maximum symbol quantities includes:

a ratio of the first maximum symbol quantity to the second maximum symbol quantity is equal to a ratio of the first subcarrier width to the second subcarrier width, and the first subcarrier width is different from the second subcarrier width.

Optionally, the quantity of symbols occupied by the first control channel is less than or equal to a maximum quantity of symbols included in a time domain resource region of the first control channel, and the time domain resource region is predefined, or the time domain resource region is indicated by system information, higher-layer signaling, or initial access information.

Optionally, the determining, by the terminal, the quantity of symbols occupied by the first control channel includes:

determining, by the terminal based on the subcarrier width, the maximum quantity of symbols included in the time domain resource region; and determining, by the terminal, the maximum quantity of symbols included in the time domain resource region, as the quantity of symbols occupied by the first control channel.

By using the method, the terminal directly determines the maximum quantity of symbols included in the time domain resource region, as the quantity of symbols occupied by the first control channel, to quickly determine a time-frequency resource occupied by the first control channel.

Optionally, the indication information is further used to indicate the quantity of symbols occupied by the first control channel.

Optionally, the indication information and the first control channel are in a same slot.

Optionally, the determining, by the terminal, a quantity of symbols occupied by the first control channel includes:

determining, by the terminal based on the indication information in an $M^{th}$ slot after a slot in which the indication information is received, a quantity of symbols occupied in the $M^{th}$ slot by the first control channel, where M is a positive integer greater than or equal to 1.

According to the method, a subcarrier width used for the first control channel sent in the $M^{th}$ slot and/or the quantity of symbols occupied in the $M^{th}$ slot by the first control channel are indicated by the indication information sent in a slot before the $M^{th}$ slot. Therefore, the subcarrier width used for the first control channel resource sent in the $M^{th}$ slot and/or the quantity of symbols occupied by the first control channel resource sent in the $M^{th}$ slot can be configured more flexibly.

Optionally, the determining, by the terminal based on the indication information, a quantity of symbols occupied by the first control channel includes:

determining, by the terminal based on the indication information in N consecutive slots starting from a $P^{th}$ slot after a slot in which the indication information is received, a quantity of symbols occupied in each of the N slots by the first control channel, where P and N are positive integers greater than 1.

According to the method, the subcarrier width used for the first control channel sent in each of the N consecutive slots and/or the quantity of symbols occupied by the first control channel sent in each of the N consecutive slots are indicated by the indication information sent in a slot before the N slots. Therefore, the subcarrier width used for the first control channel resource sent in each of the N slots and/or the quantity of symbols occupied by the first control channel resource sent in each of the N slots can be configured more flexibly.

Optionally, N is a preset value, or N is determined by the terminal based on a received higher-layer signaling configuration.

Optionally, after the determining, by the terminal based on the indication information, a quantity of symbols occupied by the first control channel, the method further includes:

obtaining, by the terminal, control information on the first control channel, where the control information is used to indicate a subcarrier width used for a second control channel; and determining, by the terminal based on the control information, a quantity of symbols occupied by the second control channel.

Optionally, the control information further indicates a time domain resource region occupied by the second control channel; and the determining, by the terminal based on the control information, a quantity of symbols occupied by the second control channel includes:

determining, by the terminal based on the subcarrier width used for the second control channel, a maximum quantity of symbols included in the time domain resource region occupied by the second control channel; and determining, by the terminal, the maximum quantity of symbols included in the time domain resource region occupied by the second control channel, as the quantity of symbols occupied by the second control channel.

Optionally, after the determining, by the terminal based on the indication information, a quantity of symbols occupied by the first control channel, the method further includes:

obtaining, by the terminal, control information on the first control channel, where the control information is used to indicate information about a subcarrier width used for a data channel of a second control channel;

determining, by the terminal based on the subcarrier width used for the data channel, a subcarrier width used for the second control channel; and determining, by the terminal based on the subcarrier width used for the second control channel, a quantity of symbols occupied by the second control channel.

According to a second aspect, an embodiment this application provides a resource configuration apparatus, including:

a transceiver unit, configured to receive indication information, where the indication information is used to indicate a subcarrier width used for a first control channel, a maximum quantity of symbols occupied by the first control channel is determined by the subcarrier width, and the different subcarrier widths correspond to different maximum symbol quantities; and a processing unit, configured to determine, based on the indication information, a quantity of symbols occupied by the first control channel, where the quantity of symbols occupied by the first control channel is less than or equal to the maximum quantity of symbols.

Optionally, the subcarrier width includes a first subcarrier width and a second subcarrier width, and the maximum quantity of symbols occupied by the first control channel includes a first maximum symbol quantity and a second maximum symbol quantity, where the first maximum symbol quantity corresponds to the first subcarrier width, and the second maximum symbol quantity corresponds to the second subcarrier width; and that the different subcarrier widths correspond to different maximum symbol quantities includes:

a ratio of the first maximum symbol quantity to the second maximum symbol quantity is equal to a ratio of the first subcarrier width to the second subcarrier width, and the first subcarrier width is different from the second subcarrier width.

Optionally, the quantity of symbols occupied by the first control channel is less than or equal to a maximum quantity of symbols included in a time domain resource region of the first control channel, and the time domain resource region is predefined, or the time domain resource region is indicated by system information, higher-layer signaling, or initial access information.

Optionally, the processing unit is specifically configured to:

determine, based on the subcarrier width, the maximum quantity of symbols included in the time domain resource region; and determine the maximum quantity of symbols included in the time domain resource region, as the quantity of symbols occupied by the first control channel.

Optionally, the indication information is further used to indicate the quantity of symbols occupied by the first control channel.

Optionally, the indication information and the first control channel are in a same slot, where the indication information may be physical layer broadcast signaling, for example, PCFICH signaling, and the physical layer broadcast signaling is used to indicate a quantity of symbols used for a control channel in a current slot.

Optionally, the processing unit is specifically configured to:

determine, based on the indication information in an $M^{th}$ slot after a slot in which the indication information is received, a quantity of symbols occupied in the $M^{th}$ slot by the first control channel, where M is a positive integer greater than or equal to 1.

Optionally, the processing unit is specifically configured to:

determine, based on the indication information in N consecutive slots starting from a $P^{th}$ slot after a slot in which the indication information is received, a quantity of symbols occupied in each of the N slots by the first control channel, where P and N are positive integers greater than 1.

Optionally, N is a preset value, or N is determined by the apparatus based on a received higher-layer signaling configuration.

Optionally, the transceiver unit is further configured to:

obtain control information on the first control channel, where the control information is used to indicate a subcarrier width used for a second control channel; and the processing unit is further configured to determine, based on the control information, a quantity of symbols occupied by the second control channel.

Optionally, the control information further indicates a time domain resource region occupied by the second control channel; and the processing unit is specifically configured to:

determine, based on the subcarrier width used for the second control channel, a maximum quantity of symbols included in the time domain resource region occupied by the second control channel; and determine the maximum quantity of symbols included in the time domain resource region occupied by the second control channel, as the quantity of symbols occupied by the second control channel.

Optionally, the transceiver unit is further configured to:

obtain control information on the first control channel, where the control information is used to indicate information about a subcarrier width used for a data channel of a second control channel; and the processing unit is further configured to: determine, based on the subcarrier width used for the data channel, a subcarrier width used for the second control channel; and determine, based on the subcarrier width used for the second control channel, a quantity of symbols occupied by the second control channel.

According to a third aspect, an embodiment of this application further provides a terminal, including:

a transceiver, configured to receive indication information, where the indication information is used to indicate a subcarrier width used for a first control channel, a maximum quantity of symbols occupied by the first control channel is determined by the subcarrier width, and the different subcarrier widths correspond to different maximum symbol quantities; and a processor, configured to determine, based on the indication information, a quantity of symbols occupied by the first control channel, where the quantity of symbols occupied by the first control channel is less than or equal to the maximum quantity of symbols.

Optionally, the subcarrier width includes a first subcarrier width and a second subcarrier width, and the maximum quantity of symbols occupied by the first control channel includes a first maximum symbol quantity and a second maximum symbol quantity, where the first maximum symbol quantity corresponds to the first subcarrier width, and the second maximum symbol quantity corresponds to the second subcarrier width; and that the different subcarrier widths correspond to different maximum symbol quantities includes:

a ratio of the first maximum symbol quantity to the second maximum symbol quantity is equal to a ratio of the first subcarrier width to the second subcarrier width, and the first subcarrier width is different from the second subcarrier width.

Optionally, the quantity of symbols occupied by the first control channel is less than or equal to a maximum quantity of symbols included in a time domain resource region of the first control channel, and the time domain resource region is predefined, or the time domain resource region is indicated by system information, higher-layer signaling, or initial access information.

Optionally, the processor is specifically configured to:

determine, based on the subcarrier width, the maximum quantity of symbols included in the time domain resource region; and determine the maximum quantity of symbols included in the time domain resource region, as the quantity of symbols occupied by the first control channel.

Optionally, the indication information is further used to indicate the quantity of symbols occupied by the first control channel.

Optionally, the indication information and the first control channel are in a same slot.

Optionally, the processor is specifically configured to:

determine, based on the indication information in an $M^{th}$ slot after a slot in which the indication information is received, a quantity of symbols occupied in the $M^{th}$ slot by the first control channel, where M is a positive integer greater than or equal to 1.

"An $M^{th}$ slot after a slot in which the indication information is received" does not include the slot in which the indication information is received, and the quantity of symbols used for the first control channel in the $M^{th}$ slot may change; and the indication information may be downlink control indication information, and the downlink control indication information further includes indication information used to indicate a value of M.

Optionally, the processor is specifically configured to:

determine, based on the indication information in N consecutive slots starting from a $P^{th}$ slot after a slot in which the indication information is received, a quantity of symbols occupied in each of the N slots by the first control channel, where P and N are positive integers greater than 1.

"A $P^{th}$ slot after a slot in which the indication information is received" does not include the slot in which the indication information is received, and the quantity of symbols used for the first control channel in the N consecutive slots starting from the $P^{th}$ slot may change.

The indication information may be higher-layer signaling, for example, radio resource control RRC signaling, and the higher-layer signaling corresponds to a predefined value of P.

Optionally, the indication information may be downlink control indication information, and the downlink control indication information further includes indication information used to indicate values of P and N.

Optionally, N is a preset value, or N is determined by the apparatus based on a received higher-layer signaling configuration.

Optionally, the transceiver is further configured to:

obtain control information on the first control channel, where the control information is used to indicate a subcarrier width used for a second control channel; and the processor is further configured to determine, based on the control information, a quantity of symbols occupied by the second control channel.

Optionally, the control information further indicates a time domain resource region occupied by the second control channel; and the processor is specifically configured to:

determine, based on the subcarrier width used for the second control channel, a maximum quantity of symbols included in the time domain resource region occupied by the second control channel; and determine the maximum quantity of symbols included in the time domain resource region occupied by the second control channel, as the quantity of symbols occupied by the second control channel.

Optionally, the transceiver is further configured to:

obtain control information on the first control channel, where the control information is used to indicate information about a subcarrier width used for a data channel of a second control channel; and the processor is further configured to: determine, based on the subcarrier width used for the data channel, a subcarrier width used for the second control channel; and determine, based on the subcarrier width used for the second control channel, a quantity of symbols occupied by the second control channel.

According to a fourth aspect, an embodiment of this application provides a computer storage medium, configured to store computer software instructions used by the resource configuration apparatus provided in the second aspect or the third aspect, and the computer storage medium includes a program designed for executing the first aspect.

According to a fifth aspect, an embodiment this application provides a resource configuration method, including:

generating, by an access network device, indication information, where the indication information is used to indicate a subcarrier width used for a first control channel, a maximum quantity of symbols occupied by the first control channel is determined by the subcarrier width, and the different subcarrier widths correspond to different maximum symbol quantities; and sending, by the access network device, the indication information to a terminal.

According to the method, the access network device indicates, by using the indication information, the subcarrier width used for the first control channel, so that the terminal can determine, based on the subcarrier width used for the first control channel, the maximum quantity of symbols that corresponds to the subcarrier width used for the first control channel, determine a time-frequency resource occupied by the first control channel, quickly determine information carried in the first control channel, and quickly access a network, thereby increasing resource utilization.

Optionally, the subcarrier width includes a first subcarrier width and a second subcarrier width, and the maximum quantity of symbols occupied by the first control channel includes a first maximum symbol quantity and a second maximum symbol quantity, where the first maximum symbol quantity corresponds to the first subcarrier width, and the second maximum symbol quantity corresponds to the second subcarrier width; and that the different subcarrier widths correspond to different maximum symbol quantities includes:

a ratio of the first maximum symbol quantity to the second maximum symbol quantity is equal to a ratio of the first subcarrier width to the second subcarrier width, and the first subcarrier width is different from the second subcarrier width.

Optionally, the quantity of symbols occupied by the first control channel is less than or equal to a maximum quantity of symbols included in a time domain resource region of the first control channel, and the time domain resource region is predefined, or the time domain resource region is indicated by system information, higher-layer signaling, or initial access information.

Optionally, the indication information indicates a quantity of symbols occupied by the first control channel that is transmitted in a slot in which the indication information is sent.

Optionally, the indication information indicates a quantity of symbols occupied by the first control channel that is transmitted in an $M^{th}$ slot after the slot in which the indication information is sent, where M is a positive integer greater than or equal to 1.

Optionally, the indication information indicates a quantity of symbols occupied by the first control channel that is transmitted in each of N consecutive slots starting from a $P^{th}$ slot after a slot in which the indication information is sent, where P and N are positive integers greater than 1.

Optionally, the indication information is in a first slot of a subframe in which the indication information is sent; and the indication information indicates a time-frequency resource, used to transmit the first control channel, in each slot included in the subframe.

Optionally, the method further includes:

sending, by the access network device, control information by using the time-frequency resource used to transmit the first control channel, where the control information is used to indicate a subcarrier width used for a second control channel, or the control information is used to indicate information about a subcarrier width for a data channel of a second control channel.

Optionally, the control information further indicates a time domain resource region occupied by the second control channel.

Optionally, the sending, by the access network device, the indication information to a terminal includes:

sending, by the access network device, the indication information to the terminal by using higher-layer signaling, for example, radio resource control RRC signaling; or sending, by the access network device, the indication information to the terminal by using downlink control information, for example, DCI; or sending, by the access network device, the indication information to the terminal by using physical layer broadcast signaling, for example, a physical control format indicator channel PCFICH.

According to a sixth aspect, an embodiment this application provides a resource configuration apparatus, including:

a processing unit, configured to generate indication information, where the indication information is used to indicate a subcarrier width used for a first control channel, a maximum quantity of symbols occupied by the first control channel is determined by the subcarrier width, and the different subcarrier widths correspond to different maximum symbol quantities; and a transceiver unit, configured to send the indication information to a terminal.

Optionally, the subcarrier width includes a first subcarrier width and a second subcarrier width, and the maximum quantity of symbols occupied by the first control channel includes a first maximum symbol quantity and a second maximum symbol quantity, where the first maximum symbol quantity corresponds to the first subcarrier width, and the second maximum symbol quantity corresponds to the second subcarrier width; and that the different subcarrier widths correspond to different maximum symbol quantities includes:

a ratio of the first maximum symbol quantity to the second maximum symbol quantity is equal to a ratio of the first subcarrier width to the second subcarrier width, and the first subcarrier width is different from the second subcarrier width.

Optionally, the quantity of symbols occupied by the first control channel is less than or equal to a maximum quantity of symbols included in a time domain resource region of the first control channel, and the time domain resource region is predefined, or the time domain resource region is indicated by system information, higher-layer signaling, or initial access information.

Optionally, the indication information indicates a quantity of symbols occupied by the first control channel that is transmitted in a slot in which the indication information is sent.

Optionally, the indication information indicates a quantity of symbols occupied by the first control channel that is transmitted in an $M^{th}$ slot after the slot in which the indication information is sent, where M is a positive integer greater than or equal to 1.

Optionally, the indication information indicates a quantity of symbols occupied by the first control channel that is transmitted in each of N consecutive slots starting from a $P^{th}$ slot after a slot in which the indication information is sent, where P and N are positive integers greater than 1.

Optionally, the indication information is in a first slot of a subframe in which the indication information is sent; and the indication information indicates a time-frequency resource, used to transmit the first control channel, in each slot included in the subframe.

Optionally, the transceiver unit is further configured to:

send control information by using the time-frequency resource used to transmit the first control channel, where the control information is used to indicate a subcarrier width used for a second control channel, or the control information is used to indicate information about a subcarrier width for a data channel of a second control channel.

Optionally, the control information further indicates a time domain resource region occupied by the second control channel.

According to a seventh aspect, an embodiment of this application provides an access network device, including:

a processor, configured to generate indication information, where the indication information is used to indicate a subcarrier width used for a first control channel, a maximum quantity of symbols occupied by the first control channel is determined by the subcarrier width, and the different subcarrier widths correspond to different maximum symbol quantities; and a transceiver, configured to send the indication information to a terminal.

Optionally, the subcarrier width includes a first subcarrier width and a second subcarrier width, and the maximum quantity of symbols occupied by the first control channel includes a first maximum symbol quantity and a second maximum symbol quantity, where the first maximum symbol quantity corresponds to the first subcarrier width, and the second maximum symbol quantity corresponds to the second subcarrier width; and that the different subcarrier widths correspond to different maximum symbol quantities includes:

a ratio of the first maximum symbol quantity to the second maximum symbol quantity is equal to a ratio of the first subcarrier width to the second subcarrier width, and the first subcarrier width is different from the second subcarrier width.

Optionally, the quantity of symbols occupied by the first control channel is less than or equal to a maximum quantity of symbols included in a time domain resource region of the first control channel, and the time domain resource region is predefined, or the time domain resource region is indicated by system information, higher-layer signaling, or initial access information.

Optionally, the indication information indicates a quantity of symbols occupied by the first control channel that is transmitted in a slot in which the indication information is sent.

Optionally, the indication information indicates a quantity of symbols occupied by the first control channel that is transmitted in an $M^{th}$ slot after the slot in which the indication information is sent, where M is a positive integer greater than or equal to 1.

Optionally, the indication information indicates a quantity of symbols occupied by the first control channel that is transmitted in each of N consecutive slots starting from a $P^{th}$ slot after a slot in which the indication information is sent, where P and N are positive integers greater than 1.

Optionally, the indication information is in a first slot of a subframe in which the indication information is sent; and the indication information indicates a time-frequency resource, used to transmit the first control channel, in each slot included in the subframe.

Optionally, the transceiver is further configured to:

send control information by using the time-frequency resource used to transmit the first control channel, where the control information is used to indicate a subcarrier width used for a second control channel, or the control information is used to indicate information about a subcarrier width for a data channel of a second control channel.

Optionally, the control information further indicates a time domain resource region occupied by the second control channel.

According to an eighth aspect, an embodiment of this application provides a computer storage medium, configured to store computer software instructions used by the resource configuration apparatus provided in the sixth aspect or the seventh aspect, and the computer storage medium includes a program designed for executing the fifth aspect.

DESCRIPTION OF EMBODIMENTS

Figure 1:
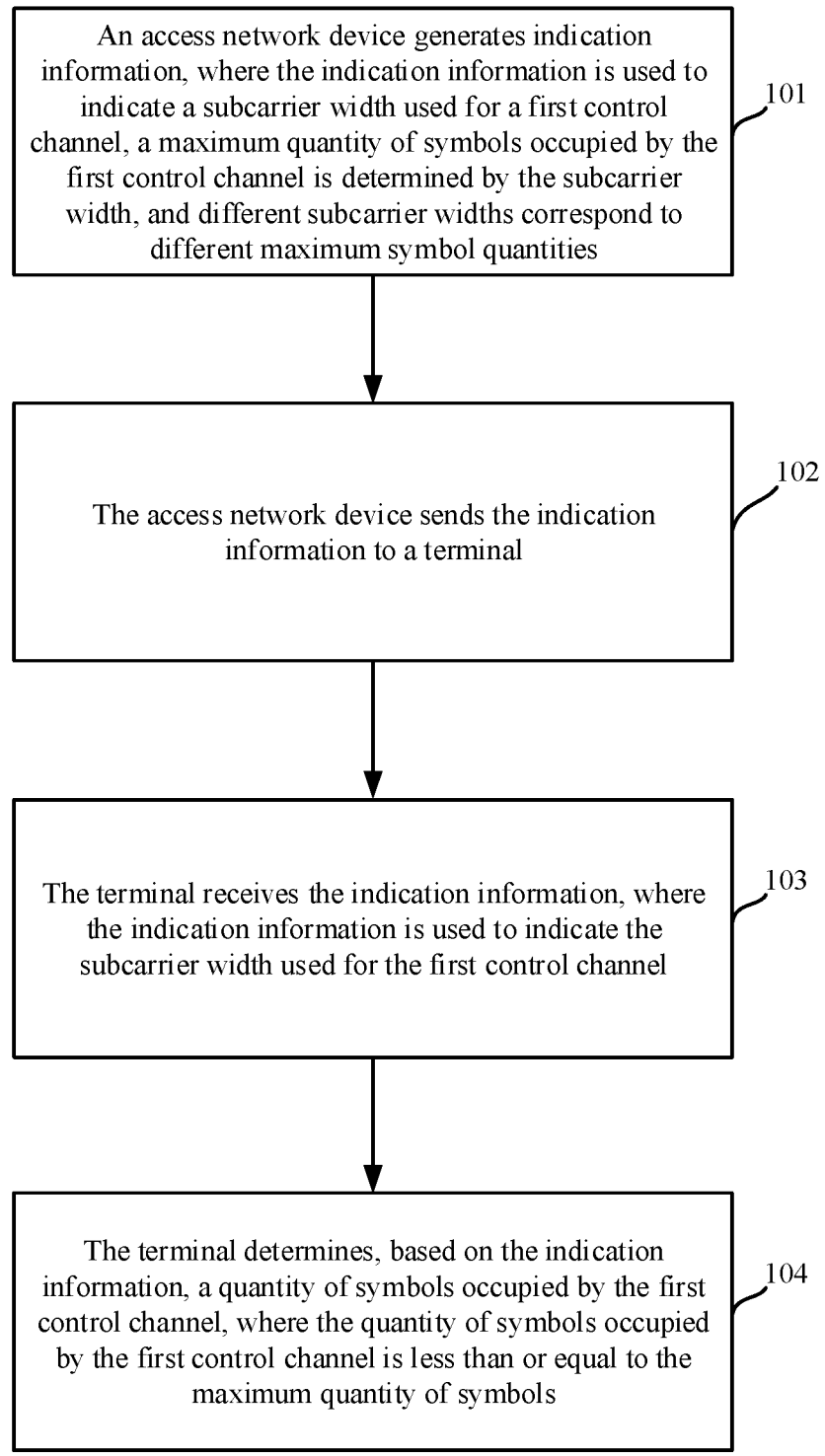
FIG. 1 is a schematic flowchart of a resource configuration method according to an embodiment of this application.

The embodiments of this application may be applied to various mobile communications systems, for example, a global system for mobile communications (Global System of Mobile communication, GSM) system, a code division multiple access (Code Division Multiple Access, CDMA) system, a wideband code division multiple access (Wideband Code Division Multiple Access, WCDMA) system, general packet radio service (General Packet Radio Service, GPRS), a long term evolution (Long Term Evolution, LTE) system, a long term evolution-advanced (Advanced Long Term Evolution, LTE-A) system, a universal mobile telecommunications system (Universal Mobile Telecommunication System, UMTS), an evolved long term evolution (evolved Long Term Evolution, eLTE) system, and a 5G mobile communications system.

In the following, some terms in this application are described, so as to help persons skilled in the art have a better understanding.

(1) Terminal: also referred to as user equipment (User Equipment, UE), is a device that provides voice and/or data connectivity for a user, for example, a handheld device or an in-vehicle device having a wireless connection function. Common terminals include, for example, a mobile phone, a tablet computer, a notebook computer, a palm computer, a mobile Internet device (mobile internet device, MID), and a wearable device such as a smartwatch, a smart band, or a pedometer.

(2) Access network device: may be a common base station (for example, a NodeB or an eNB), may be a new radio controller (New Radio controller, NR controller), may be a gNB in a 5G system, may be a centralized unit (Centralized Unit), may be a new radio base station, may be a remote radio unit, may be a micro base station, may be a relay (relay), may be a distributed unit (Distributed Unit), or may be a transmission/reception point (Transmission/Reception Point, TRP), a transmission point (Transmission Point, TP), or any other radio access devices. This is not limited in the embodiments of this application.

(3) Symbol: includes but is not limited to an orthogonal frequency division multiplexing (Orthogonal Frequency Division Multiplexing, OFDM) symbol, a sparse code multiplexing access (Sparse Code Multiplexing Access, SCMA) symbol, a filtered orthogonal frequency division multiplexing (Filtered Orthogonal Frequency Division Multiplexing, F-OFDM) symbol, and a non-orthogonal multiple access (Non-Orthogonal Multiple Access, NOMA) symbol. Details may be determined depending on an actual case, and are not described herein.

(4) Subframe: a subframe occupies a time-frequency resource of an entire system bandwidth in frequency domain, and occupies a fixed time length in time domain, for example, 1 millisecond (ms). In addition, a subframe may alternatively occupy K consecutive symbols, where K is a natural number greater than 0. A value of K may be determined depending on an actual case, and this is not limited herein. For example, in LTE, a subframe occupies 14 consecutive OFDM symbols in time domain.

(5) Slot: A slot is a basic time-frequency resource element, and occupies L consecutive OFDM symbols in time domain, where L is a natural number greater than 0. A value of L may be determined depending on an actual case. For example, a slot occupies seven OFDM symbols.

(6) Physical resource block (Physical Resource Block, PRB): is a time-frequency resource element, occupies one subframe or one slot in time domain, and occupies M consecutive subcarriers in frequency domain, where M is a natural number greater than 0. In LTE, a physical resource block occupies 14 consecutive OFDM symbols of a subframe in time domain, and occupies 12 consecutive subcarriers in frequency domain.

(7) Subcarrier width: is a smallest granularity in frequency domain. For example, in LTE, a subcarrier width of a subcarrier is 15 kHz.

Based on the foregoing descriptions, FIG. 1 is a schematic flowchart of a resource configuration method according to an embodiment of this application.

Referring to FIG. 1, the method includes the following steps.

Step 101: An access network device generates indication information, where the indication information is used to indicate a subcarrier width used for a first control channel, a maximum quantity of symbols occupied by the first control channel is determined by the subcarrier width, and the different subcarrier widths correspond to different maximum symbol quantities.

The subcarrier width used for the first control channel is a subcarrier width used to send the first control channel. When the subcarrier width used to transmit the first control channel is increased, duration of each symbol occupied by the first control channel is shortened; however, a total quantity of time-frequency resources occupied by the first control channel maintains unchanged.

It should be noted that symbols occupied by the first control channel sent in a slot are a plurality of symbols starting from an initial symbol (including the initial symbol) in the slot. For example, the first control channel sent in a slot n occupies three symbols; in this case, the symbols occupied by the first control channel are first three symbols in the slot n.

It should be noted that in this embodiment of this application, the first control channel includes but is not limited to a channel such as a PDCCH or an EPDCCH.

In this embodiment of this application, the maximum quantity of symbols occupied by the first control channel is a maximum quantity of symbols that can be used within a time-frequency resource of the first control channel. When the subcarrier width used to transmit the first control channel is increased, the duration of each symbol occupied by the first control channel is shortened; therefore, if a maximum time occupied by the first control channel in time domain is fixed, the maximum quantity of symbols increases with the increase of the subcarrier width used for the first control channel.

A time-frequency resource in each slot usually includes a control region and a data region. The control region is used to send control information, and the data region is used to send data. In this embodiment of this application, the time-frequency resource of the first control channel is a time-frequency resource included in a control region of a slot in which the first control channel is located.

Step 102: The access network device sends the indication information to a terminal.

The access network device may send the indication information in a plurality of manners. In a first possible implementation, the access network device sends the indication information to the terminal by using higher-layer signaling. For example, the higher-layer signaling includes a master information block (Master Information Block, MIB), a system information block (System Information Block, SIB), radio resource control (Radio Resource Control, RRC) signaling, or other higher-layer signaling having a similar characteristic.

In a second possible implementation, the access network device sends the indication information to the terminal by using downlink control information (Downlink Control Information, DCI), for example, sending the indication information in common search space of a downlink control channel. A time-frequency resource for the downlink control channel includes at least one OFDM symbol of initial OFDM symbols of a slot or a subframe. The search space is a part of the time-frequency resource for the downlink control channel. Control information in the common search space may be received by a group of terminals or all terminals in a cell.

In a third possible implementation, the access network device sends the indication information to the terminal by using physical layer broadcast control signaling, for example, similar to broadcast signaling carried in a PCFICH channel in LTE; or a time-frequency resource occupied by the physical layer broadcast control signaling includes at least one OFDM symbol of initial OFDM symbols of a slot or a subframe, and the physical layer broadcast control signaling may be detected and received by a group of terminals or all terminals in a cell.

Certainly, the access network device may alternatively send the indication information in other manners. Examples are not described one by one herein.

Step 103: The terminal receives the indication information, where the indication information is used to indicate the subcarrier width used for the first control channel.

Step 104: The terminal determines, based on the indication information, a quantity of symbols occupied by the first control channel, where the quantity of symbols occupied by the first control channel is less than or equal to the maximum quantity of symbols.

For example, the first control channel may occupy a maximum of four symbols, but the first control channel may actually use two symbols; in this case, the quantity of symbols used for the first control channel is less than the maximum quantity of symbols.

In step 101, the time domain resource region of the first control channel may be predefined between the access network device and the terminal, or may be indicated by the access network device to the terminal by using system information, higher-layer signaling, or initial access information. The system information may be most essential system information used for initial access, for example, a master information block (Master information Block, MIB) in LTE, or is referred to as an essential system information block (Essential System Information Block, eSIB), a system information block (System Information Block, SIB), or the like in a next generation system. The initial access information may include a random access response (Random Access Response, RAR), a Message4, or the like. The Message4 may be an RRC establishment or re-establishment command sent by the access network device to the terminal in LTE.

For example, the access network device may indicate, to the terminal by using the RAR, the time domain resource region of the first control channel. The RAR includes at least uplink timing advance (Timing Advance, TA) indication information.

The access network device may alternatively indicate, to the terminal by using the Message4, the time domain resource region of the first control channel. The Message4 may be an RRC establishment or re-establishment command sent by the access network device to the terminal in LTE. The Message4 includes at least terminal identification indication information.

In this embodiment of this application, an area of the time-frequency resource occupied by the first control channel maintains unchanged, that is, a product of duration, in time domain, of the time-frequency resource occupied by the first control channel and a bandwidth width of the time-frequency resource in frequency domain maintains unchanged. A time domain resource is expressed in a quantity of OFDM symbols, and a bandwidth width is in a unit of kHz. Specifically, if the subcarrier width may include a first subcarrier width and a second subcarrier width, and the maximum quantity of symbols occupied by the first control channel includes a first maximum symbol quantity and a second maximum symbol quantity, a ratio of the first maximum symbol quantity to the second maximum symbol quantity is equal to a ratio of the first subcarrier width to the second subcarrier width, and the first subcarrier width is different from the second subcarrier width. The first maximum symbol quantity corresponds to the first subcarrier width, and the second maximum symbol quantity corresponds to the second subcarrier width.

Figure 2:
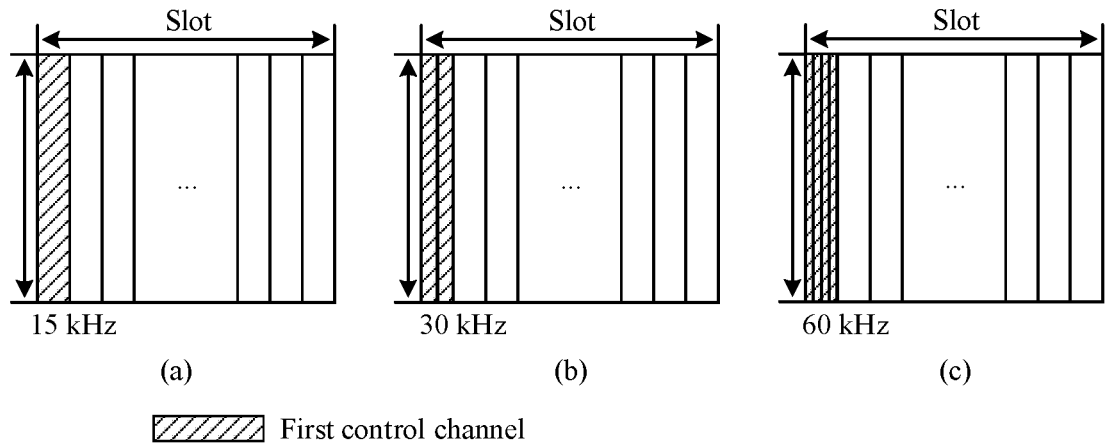
FIG. 2 is a schematic diagram of resource indication according to an embodiment of this application.

For example, (a) in FIG. 2 to (c) in FIG. 2 are schematic diagrams of a time-frequency resource according to an embodiment of this application. As shown in (a) in FIG. 2 to (c) in FIG. 2, when a size of the time-frequency resource occupied by the first control channel is fixed and different subcarrier widths are used for the first control channel, the first control channel occupies different quantity of symbols.

Specifically, as shown in (a) in FIG. 2, a subcarrier width of 15 kHz is used for the first control channel, and the first control channel occupies one symbol; it is assumed that the one symbol is the first maximum symbol quantity, and 15 kHz is the first subcarrier width. As shown in (b) in FIG. 2, a subcarrier width of 30 kHz is used for the first control channel, and the first control channel occupies two symbols; it is assumed that the two symbols are the second maximum symbol quantity, and 30 kHz is the second subcarrier width. Based on the foregoing assumptions, a ratio of the first maximum symbol quantity to the second maximum symbol quantity is ½, and a ratio of the first subcarrier width to the second subcarrier width is also ½.

As shown in (c) in FIG. 2, a subcarrier width of 60 kHz is used for the first control channel, and the first control channel occupies four symbols. Similarly, the subcarrier width in (c) in FIG. 2 is set as the first or second subcarrier width, and the symbol quantity is set as the first or second maximum symbol quantity; this also complies with the rule in (a) in FIG. 2 or (b) in FIG. 2, that is, a ratio of the first maximum symbol quantity to the second maximum symbol quantity is equal to a ratio of the first subcarrier width to the second subcarrier width.

With reference to the foregoing description, in this embodiment of this application, there is a mapping relationship between a subcarrier width used in a time-frequency resource and a maximum quantity of symbols included in the time-frequency resource. After determining a subcarrier width used in each time-frequency resource, the terminal may determine a maximum quantity of symbols mapped with the subcarrier width used in each time-frequency resource, to determine a maximum quantity of symbols included in each time-frequency resource.

In this embodiment of this application, the access network device may use all resources in the time domain resource region of the first control channel to send the first control channel. In this case, in step 104, the terminal may first determine, based on the indication information, the subcarrier width used for the first control channel; then determine, based on the subcarrier width, a maximum quantity of symbols included in the time domain resource region; and finally determine the maximum quantity of symbols included in the time domain resource region as the quantity of symbols occupied by the first control channel.

Optionally, the access network device may alternatively not use all resources in the time domain resource region of the first control channel to send the first control channel; therefore, the quantity of symbols occupied by the first control channel is less than or equal to the maximum quantity of symbols included in the time domain resource region of the first control channel. A specific quantity of symbols occupied by the first control channel needs to be determined depending on an actual case. For example, the time domain resource region of the first control channel includes a maximum of four consecutive symbols, but the access network device uses only first two symbols to send the first control channel, and uses the rest two symbols to transmit other data.

In this case, the indication information sent by the access network device may be further used to indicate the quantity of symbols occupied by the first control channel. It should be noted that in this implementation, the indication information and the first control channel may be sent in a same slot, or may be sent in different slots.

In this case, in step 104, the terminal may directly determine, based on the indication information, the quantity of symbols occupied by the first control channel.

The time-frequency resource region of the first control channel has been predefined between the access network device and the terminal, or has been notified to the terminal by the access network device by using the higher-layer signaling or initial access information; therefore, the quantity, indicated by the indication information, of symbols occupied by the first control channel does not exceed the maximum quantity of symbols included in the time-frequency resource region of the first control channel. In this way, signaling used to send the indication information is saved, thereby reducing resources.

There may be a plurality of implementations for the indication information to indicate both the subcarrier width used for the first control channel and the quantity of symbols occupied by the first control channel. In a possible implementation, the indication information includes K bits, and different values of the K bits included in the indication information correspond to different subcarrier widths and different symbol quantities.

For example, Table 1 shows a correspondence among indication information, a subcarrier width, and an actual symbol quantity.

TABLE 1

| Indication information | Subcarrier width | Actual symbol quantity |
|---|---|---|
| 00 | 30 kHz | 2 |
| 01 | 30 kHz | 4 |
| 10 | 60 kHz | 4 |
| 11 | 60 kHz | 8 |

Certainly, the foregoing is merely an example, and the correspondence among indication information, a subcarrier width, and an actual symbol quantity may alternatively be in other forms. Examples are not described one by one herein.

In this embodiment of this application, the indication information may not only indicate a subcarrier width used for the first control channel that is sent in a same slot as the indication information and/or the quantity of symbols occupied by the first control channel, but also indicate a subcarrier width used for the first control channel that is sent in a slot different from that for the indication information and/or the quantity of symbols occupied by the first control channel. Detailed descriptions are provided in the following based on different scenarios.

First Scenario:

The indication information sent by the access network device may indicate at least one of a subcarrier width used for a first control channel transmitted in an $M^{th}$ slot after a slot in which the indication information is sent, and a quantity of symbols occupied by the first control channel that is transmitted in the $M^{th}$ slot, where M is a positive integer greater than or equal to 1.

For example, the indication information is in a subframe n, and after the indication information is received, a quantity of symbols used for the first control channel in an $(n+m)^{th}$ subframe is a quantity of symbols that is indicated by the indication information in the subframe n.

In this case, in step 104, after receiving the indication information, the terminal determines, based on the indication information in the $M^{th}$ slot after the slot in which the indication information is sent, at least one of the subcarrier width used for the first control channel in the $M^{th}$ slot and the quantity of symbols occupied by the first control channel.

It should be noted that "an $M^{th}$ slot after a slot in which the indication information is received" does not include the slot in which the indication information is received, and there are M−1 slots between the $M^{th}$ slot and the slot in which the indication information is received by the terminal. The quantity of symbols used for the first control channel in the $M^{th}$ slot may change.

Optionally, the indication information may be downlink control indication information. The downlink control indication information further includes indication information used to indicate a value of M. Certainly, M may alternatively be a preset value, or M may be set by the access network device by using higher-layer signaling. When M is set by the access network device by using the higher-layer signaling, the terminal determines a value of M based on a received higher-layer signaling configuration.

Figure 3:
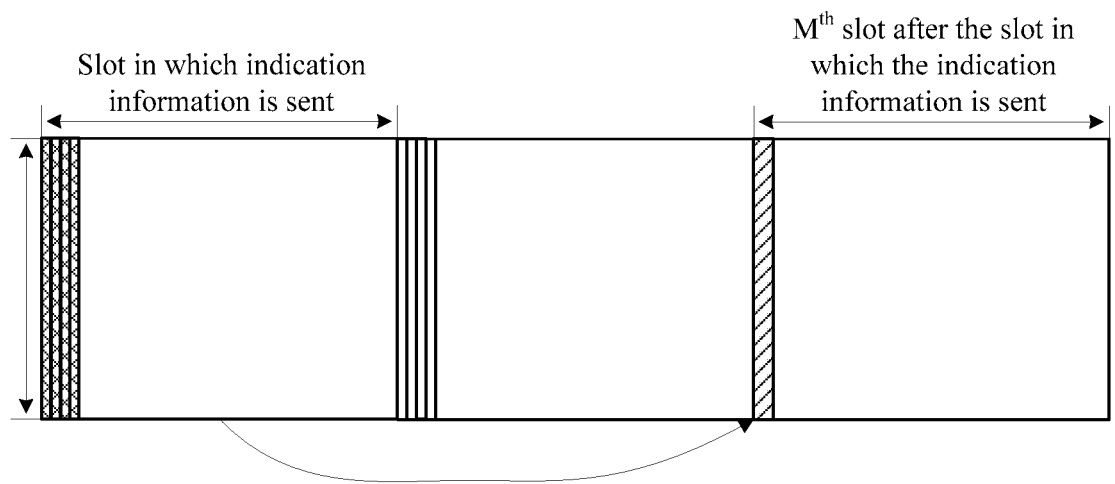
FIG. 3 is a schematic diagram of resource indication according to an embodiment of this application.

For example, FIG. 3 is a schematic diagram of resource indication according to an embodiment of this application. In FIG. 3, a subcarrier width of 60 kHz is used for the first control channel sent in a same slot as the indication information, and occupies four symbols; a subcarrier width of 30 kHz is used for a first channel in the $M^{th}$ slot after the slot in which the indication information is sent, and the first control channel occupies one symbol. All the foregoing information may be indicated by the indication information.

Optionally, the indication information may be carried in DCI.

In this scenario, the subcarrier width used for the first control channel sent in one slot and/or the quantity of symbols occupied by the first control channel are indicated by the indication information sent in a slot before the slot. Therefore, the subcarrier width used for the first control channel resource and the quantity of symbols occupied by the first control channel resource can be configured more flexibly.

Second Scenario:

The indication information sent by the access network device may indicate a subcarrier width used for the first control channel transmitted in each of N consecutive slots starting from a $P^{th}$ slot after a slot in which the indication information is sent, and/or a quantity of symbols occupied by the first control channel that is transmitted in each of the N consecutive slots, where P and N are positive integers greater than 1.

In this case, in step 104, the terminal determines, based on the indication information in N consecutive slots starting from a $P^{th}$ slot after a slot in which the indication information is received, the quantity of symbols occupied in each of the N slots by the first control channel.

It should be noted that "a $P^{th}$ slot after a slot in which the indication information is received" does not include the slot in which the indication information is received, and there are P−1 slots between the $P^{th}$ slot and the slot in which the indication information is received by the terminal. The quantity of symbols used for the first control channel in the N consecutive slots starting from the $P^{th}$ slot may change. In addition, the N slots include the $P^{th}$ slot. P and/or N may alternatively be a preset value, or P and/or N may be set by the access network device by using higher-layer signaling. When P and/or N is set by the access network device by using the higher-layer signaling, the terminal determines a value of P and/or a value of N based on a received higher-layer signaling configuration.

For example, the indication information is in a slot n, and after the indication information is received, a quantity of symbols occupied in a slot n+P by the first control channel may be indicated by the indication information carried in the slot n. In addition, a quantity of symbols used for the first control channel in each of N consecutive slots from the slot n+P to a slot n+P+N−1 is indicated by the indication information carried in the slot n.

Figure 4:
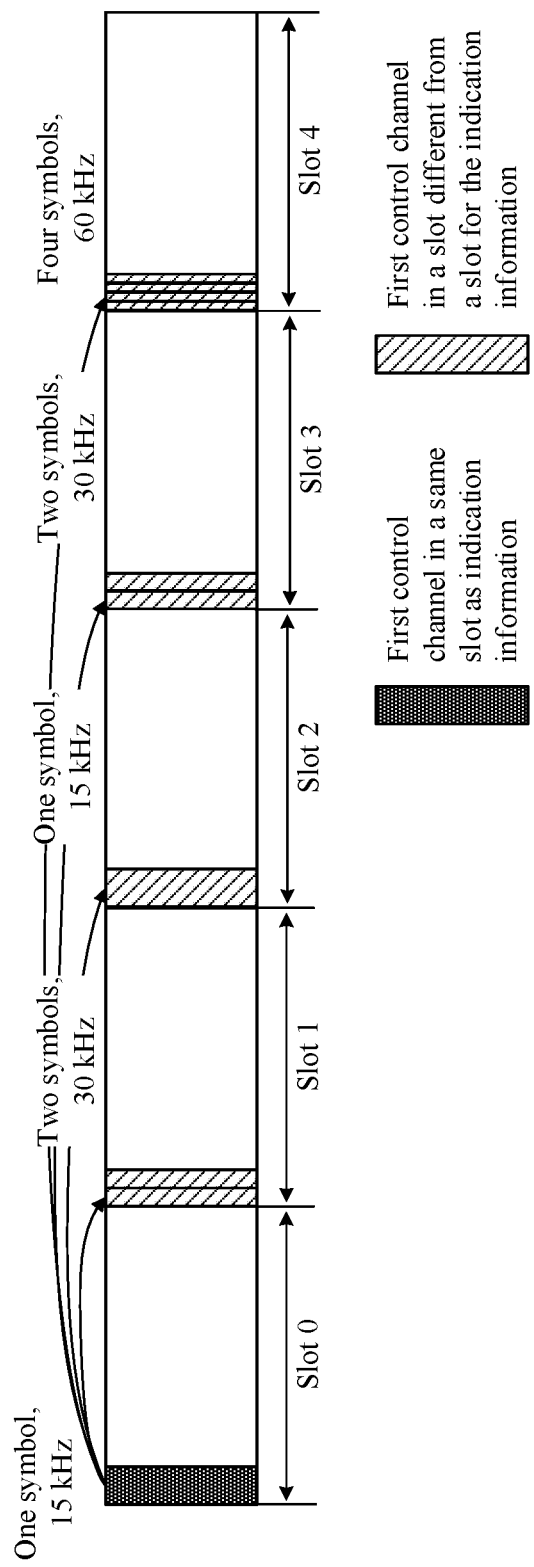
FIG. 4 is a schematic diagram of resource indication according to an embodiment of this application.

For example, FIG. 4 is a schematic diagram of resource indication according to an embodiment of this application. In FIG. 4, the indication information is in a slot 0, N consecutive slots starting from a $P^{th}$ slot after the slot 0 are a slot 1 to a slot 4. The indication information in the slot 0 indicates a subcarrier width used for a first control channel in each of the slot 1 to the slot 4, and/or a quantity of symbols occupied by the first control channel. The indication information may further indicate a subcarrier width, used for the first control channel in a same slot as the indication information, and/or a quantity of symbols occupied by the first control channel. A subcarrier width of 15 kHz is used for the first control channel in the slot 0, and the first control channel occupies one symbol in the slot 0; subcarrier widths of 30 kHz, 15 kHz, 30 kHz, and 60 kHz are used for the first control channel in the slot 1 to the slot 4, respectively; and the first control channel occupies two symbols, one symbol, two symbols, and four symbols in the slot 1 to the slot 4 respectively.

Optionally, in this scenario, the slot in which the indication information is sent may be a first slot in the subframe.

Figure 5:
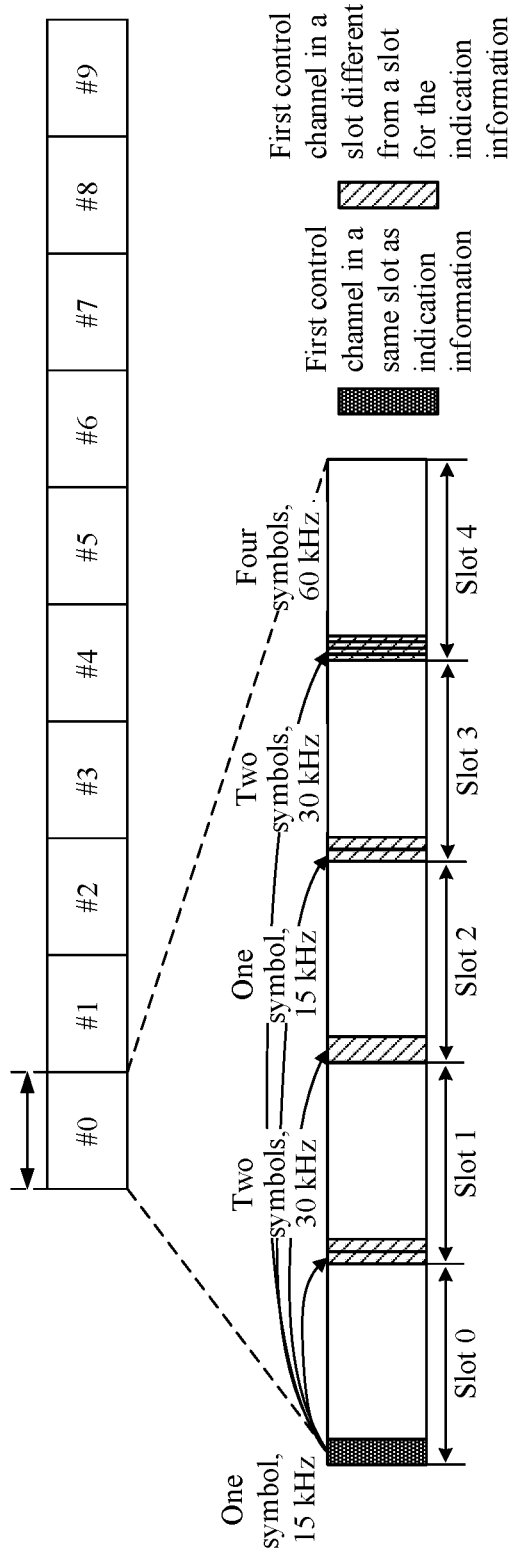
FIG. 5 is a schematic diagram of resource indication according to an embodiment of this application.

For example, FIG. 5 is a schematic diagram of resource indication according to an embodiment of this application. In FIG. 5, a radio frame includes 10 subframes: a subframe 0 to a subframe 9. The subframe 0 includes a slot 0 to a slot 4. A subcarrier width used for a first control channel in each slot in the subframe 0 and/or a quantity of symbols occupied in each slot in the subframe 0 by the first control channel may be indicated by indication information in the slot 0. Subcarrier widths of 15 kHz, 30 kHz, 15 kHz, 30 kHz, and 60 kHz are used for the first control channel in the slot 0 to the slot 4 respectively, and the first control channel occupies one symbol, two symbols, one symbol, two symbols, and four symbols in the slot 0 to the slot 4 respectively.

Optionally, in addition to the first control channel sent in a starting location of each slot, one slot further includes a second control channel sent together with a data channel in a data region.

In this embodiment of this application, the access network device may send control information through the first control channel, to indicate, based on the control information, a subcarrier width used for the second control channel.

Figure 6:
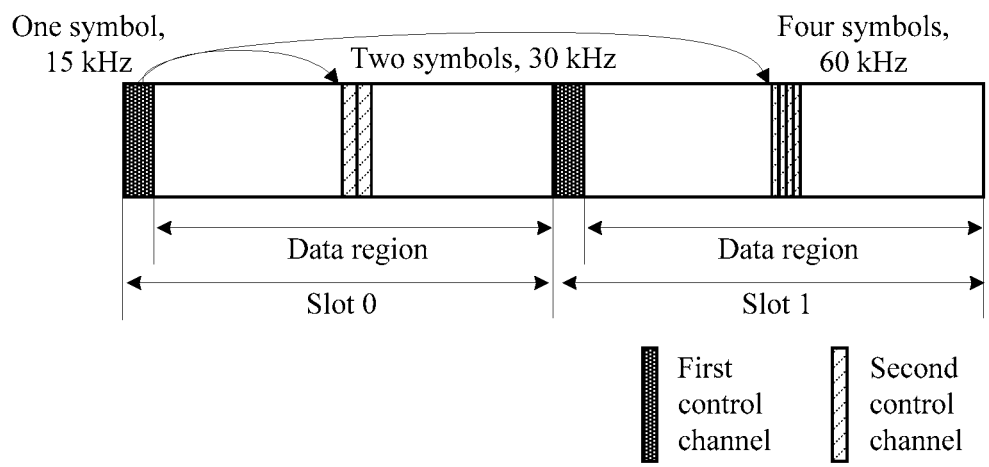
FIG. 6 is a schematic diagram of resource indication according to an embodiment of this application.

A time-frequency resource of the second control channel is in a data channel region. The data channel region is a time domain resource different from a time domain resource occupied in a current slot by the first control channel, as shown in FIG. 6. A time domain resource occupied by the second control channel may be in any OFDM symbol within a data region. In FIG. 6, data regions in the slot 0 and the slot 1 are time domain resource regions occupied by a data channel. In the slot 0, the second control channel occupies two symbols in the data region in the slot, and a subcarrier width of 30 kHz is used for the second control channel; in the slot 1, the second control channel occupies four symbols in the data region in the slot, and a subcarrier width of 60 kHz is used for the second control channel. Both a time domain resource occupied in the slot 0 by the second control channel and a time domain resource occupied in the slot 1 by the second control channel may be indicated by the first control channel in the slot 0.

In a first possible scenario, the control information is used to indicate a subcarrier width used for the second control channel.

In this scenario, after obtaining control information on a first control channel, the terminal may determine the subcarrier width used for the second control channel, to determine, based on the subcarrier width used for the second control channel, a quantity of symbols occupied by the second control channel.

The control information corresponding to the first control channel may be used to indicate the subcarrier width for the second control channel in a same slot as the first control channel, or may be used to indicate a subcarrier width for a second control channel in a slot after the slot in which the first control channel is located.

As described above, in this embodiment of this application, there is a mapping relationship between a subcarrier width used in a time-frequency resource and a maximum quantity of symbols included in the time-frequency resource. Therefore, the terminal may determine, based on the control information, the subcarrier width used for the second control channel; then determine, based on the subcarrier width used for the second control channel, a maximum quantity of symbols included in the time domain resource region occupied by the second control channel; and finally determine the maximum quantity of symbols included in the time domain resource region occupied by the second control channel, as the quantity of symbols occupied by the second control channel.

In a second possible scenario, the control information is used to indicate a subcarrier width used for a data channel of the second control channel.

In this scenario, the subcarrier width used for the second control channel is the same as the subcarrier width used for the data channel of the second control channel. After obtaining the control information on the first control channel, the terminal may first determine, based on the subcarrier width used for the data channel, the subcarrier width used for second control channel, that is, using the subcarrier width used for the data channel as the subcarrier width used for second control channel; then the terminal determines, based on the subcarrier width used for second control channel, a maximum quantity of symbols included in a time domain resource region occupied by the second control channel; finally the terminal determines the maximum quantity of symbols included in the time domain resource region occupied by the second control channel, as the quantity of symbols occupied by the second control channel.

Based on a same technical concept, an embodiment of this application further provides a resource configuration apparatus. The apparatus may execute the foregoing method embodiment.

Figure 7:
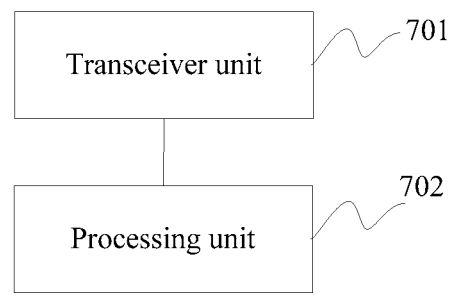
FIG. 7 is a schematic structural diagram of a resource configuration apparatus according to an embodiment of this application.

FIG. 7 is a schematic structural diagram of a resource configuration apparatus according to an embodiment of this application.

Referring to FIG. 7, the apparatus includes a transceiver unit 701 and a processing unit 702.

The transceiver unit 701 is configured to receive indication information. The indication information is used to indicate a subcarrier width used for a first control channel, a maximum quantity of symbols occupied by the first control channel is determined by the subcarrier width, and the different subcarrier widths correspond to different maximum symbol quantities.

It should be noted that the subcarrier width used for the first control channel is a subcarrier width used to send the first control channel. When the subcarrier width used to transmit the first control channel is increased, duration of each symbol occupied by the first control channel is shortened; however, a total quantity of time-frequency resources occupied by the first control channel maintains unchanged.

In this embodiment of this application, the maximum quantity of symbols occupied by the first control channel is a maximum quantity of symbols that can be used within a time-frequency resource of the first control channel.

For other content of the transceiver unit 701, refer to the descriptions in step 103, and no details are repeated herein.

The processing unit 702 is configured to determine, based on the indication information, a quantity of symbols occupied by the first control channel, where the quantity of symbols occupied by the first control channel is less than or equal to the maximum quantity of symbols.

Optionally, the subcarrier width includes a first subcarrier width and a second subcarrier width, and the maximum quantity of symbols occupied by the first control channel includes a first maximum symbol quantity and a second maximum symbol quantity. The first maximum symbol quantity corresponds to the first subcarrier width, and the second maximum symbol quantity corresponds to the second subcarrier width.

That the different subcarrier widths correspond to different maximum symbol quantities includes:

a ratio of the first maximum symbol quantity to the second maximum symbol quantity is equal to a ratio of the first subcarrier width to the second subcarrier width, and the first subcarrier width is different from the second subcarrier width.

Optionally, the quantity of symbols occupied by the first control channel is less than or equal to a maximum quantity of symbols included in a time domain resource region of the first control channel, and the time domain resource region is predefined, or the time domain resource region is indicated by system information, higher-layer signaling, or initial access information.

An access network device may use some resources in the time domain resource region of the first control channel to send the first control channel; therefore, the quantity of symbols occupied by the first control channel is less than or equal to the maximum quantity of symbols included in the time domain resource region of the first control channel. For specific content, refer to the descriptions in step 102, and no details are repeated herein.

The system information may be most essential system information used for initial access, for example, a master information block in LTE, or is referred to as an essential system information block, a system information block, or the like in a next generation system. The initial access information may include a random access response, a Message4, or the like. The Message4 may be an RRC establishment or re-establishment command sent by the access network device to a terminal in LTE.

For details of the foregoing content, refer to the descriptions in step 102, and no details are repeated herein.

The higher-layer signaling may include a master information block, a system information block, RRC signaling, or other higher-layer signaling having a similar characteristic. For details, refer to the descriptions in step 104, and no details are repeated herein.

Optionally, the processing unit 702 is specifically configured to:

determine, based on the subcarrier width, the maximum quantity of symbols included in the time domain resource region; and determine the maximum quantity of symbols included in the time domain resource region, as the quantity of symbols occupied by the first control channel.

The access network device may use all resources in the time domain resource region of the first control channel to send the first control channel; therefore, the quantity of symbols occupied by the first control channel is equal to the maximum quantity of symbols included in the time domain resource region of the first control channel. For specific content, refer to the descriptions in step 102, and no details are repeated herein.

Optionally, the indication information is further used to indicate the quantity of symbols occupied by the first control channel.

Optionally, the indication information and the first control channel are in a same slot.

In a possible implementation, the indication information may be physical layer broadcast signaling, for example, PCFICH signaling. The physical layer broadcast signaling is used to indicate a quantity of symbols used for a control channel in a current slot.

In a possible implementation, the indication information includes K bits, and different values of the K bits included in the indication information correspond to different subcarrier widths and different symbol quantities.

For other content of the indication information, refer to the descriptions in step 103 and step 104, and no details are repeated herein.

Optionally, the processing unit 702 is specifically configured to:

determine, based on the indication information in an $M^{th}$ slot after a slot in which the indication information is received, a quantity of symbols occupied in the $M^{th}$ slot by the first control channel, where M is a positive integer greater than or equal to 1.

It should be noted that "an $M^{th}$ slot after a slot in which the indication information is received" does not include the slot in which the indication information is received, and there are M−1 slots between the $M^{th}$ slot and the slot in which the indication information is received by the terminal.

Optionally, the processing unit 702 is specifically configured to:

determine, based on the indication information in N consecutive slots starting from a $P^{th}$ slot after a slot in which the indication information is received, a quantity of symbols occupied in each of the N slots by the first control channel, where P and N are positive integers greater than 1.

It should be noted that "a $P^{th}$ slot after a slot in which the indication information is received" does not include the slot in which the indication information is received, and there are P−1 slots between the $P^{th}$ slot and the slot in which the indication information is received by the terminal.

Optionally, N is a preset value, or N is determined by the apparatus based on a received higher-layer signaling configuration.

Optionally, the transceiver unit 701 is further configured to:

obtain control information on the first control channel, where the control information is used to indicate a subcarrier width used for a second control channel.

The processing unit 702 is further configured to determine, based on the control information, a quantity of symbols occupied by the second control channel.

For other content of the control information, refer to the descriptions in step 104, and no details are repeated herein.

Optionally, the control information further indicates a time domain resource region occupied by the second control channel.

The processing unit 702 is specifically configured to:

determine, based on the subcarrier width used for the second control channel, a maximum quantity of symbols included in the time domain resource region occupied by the second control channel; and determine the maximum quantity of symbols included in the time domain resource region occupied by the second control channel, as the quantity of symbols occupied by the second control channel.

Optionally, the transceiver unit 701 is further configured to:

obtain control information on the first control channel, where the control information is used to indicate information about a subcarrier width used for a data channel of a second control channel.

The processing unit 702 is further configured to: determine, based on the subcarrier width used for the data channel, a subcarrier width used for the second control channel; and determine, based on the subcarrier width used for the second control channel, a quantity of symbols occupied by the second control channel.

Figure 8:
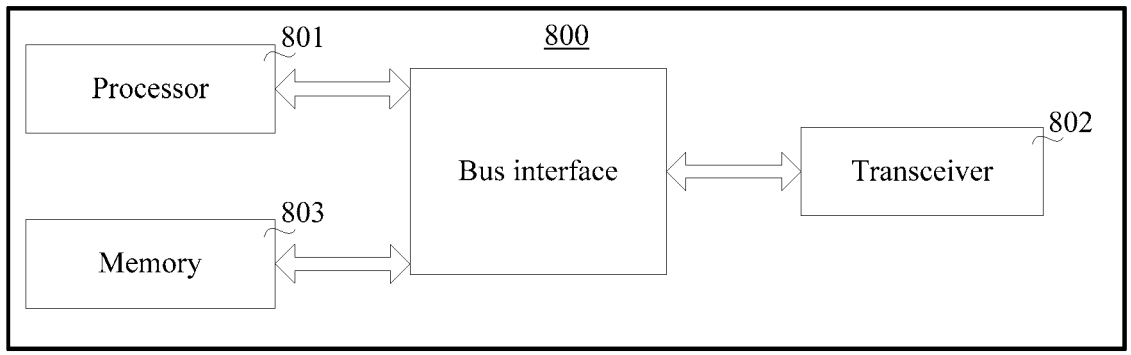
FIG. 8 is a schematic structural diagram of a terminal according to an embodiment of this application.

It should be understood that division of the foregoing units is merely logical function division. During actual implementation, all or some of the units may be integrated into one physical entity, or may be physically separate. In this embodiment of this application, the transceiver unit 701 may be implemented by a transceiver, or the processing unit 702 may be implemented by a processor. As shown in FIG. 8, a terminal 800 may include a processor 801, a transceiver 802, and a memory 803. The memory 803 may be configured to store a program/code pre-installed on the terminal 800 before delivery, or may store code or the like to be executed by the processor 801.

It should be understood that the terminal 800 according to this embodiment of this application may be corresponding to the terminal in the resource configuration method in the foregoing embodiment of this application and the terminal 800 in this embodiment of this application, and the foregoing or other operations and/or functions of the units of the terminal 800 are respectively used to implement the corresponding procedures in the method shown in FIG. 1. For brevity, no details are repeated herein.

Based on a same technical concept, an embodiment of this application further provides a resource configuration apparatus. The apparatus may execute the foregoing method embodiment.

Figure 9:
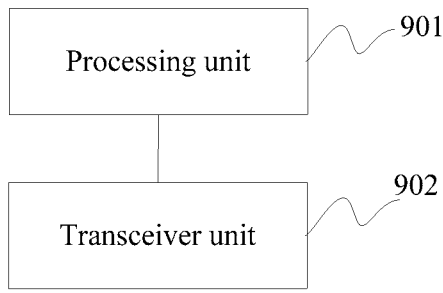
FIG. 9 is a schematic structural diagram of a resource configuration apparatus according to an embodiment of this application.

FIG. 9 is a schematic structural diagram of a resource configuration apparatus according to an embodiment of this application.

Referring to FIG. 9, the apparatus includes a processing unit 901 and a transceiver unit 902.

The processing unit 901 is configured to generate indication information. The indication information is used to indicate a subcarrier width used for a first control channel, a maximum quantity of symbols occupied by the first control channel is determined by the subcarrier width, and the different subcarrier widths correspond to different maximum symbol quantities.

It should be noted that the subcarrier width used for the first control channel is a subcarrier width used to send the first control channel. When the subcarrier width used to transmit the first control channel is increased, duration of each symbol occupied by the first control channel is shortened; however, a total quantity of time-frequency resources occupied by the first control channel maintains unchanged.

In this embodiment of this application, the maximum quantity of symbols occupied by the first control channel is a maximum quantity of symbols that can be used within a time-frequency resource of the first control channel.

For other content of the first control channel, refer to the descriptions in step 101, and no details are repeated herein.

The transceiver unit 902 is configured to send the indication information to a terminal.

The transceiver unit 902 may send the indication information in a plurality of manners. In a first possible implementation, the transceiver unit 902 may send the indication information to the terminal by using higher-layer signaling. In a second possible implementation, the transceiver unit 902 may send the indication information to the terminal by using DCI. In a third possible implementation, the transceiver unit 902 may send the indication information to the terminal by using physical layer broadcast control signaling. For specific content of the foregoing implementation, refer to the descriptions in step 102, and no details are repeated herein.

Optionally, the subcarrier width includes a first subcarrier width and a second subcarrier width, and the maximum quantity of symbols occupied by the first control channel includes a first maximum symbol quantity and a second maximum symbol quantity. The first maximum symbol quantity corresponds to the first subcarrier width, and the second maximum symbol quantity corresponds to the second subcarrier width.

That the different subcarrier widths correspond to different maximum symbol quantities includes:

a ratio of the first maximum symbol quantity to the second maximum symbol quantity is equal to a ratio of the first subcarrier width to the second subcarrier width, and the first subcarrier width is different from the second subcarrier width.

Optionally, the quantity of symbols occupied by the first control channel is less than or equal to a maximum quantity of symbols included in a time domain resource region of the first control channel, and the time domain resource region is predefined, or the time domain resource region is indicated by system information, higher-layer signaling, or initial access information.

The apparatus may use some resources in the time domain resource region of the first control channel to send the first control channel; therefore, the quantity of symbols occupied by the first control channel is less than or equal to the maximum quantity of symbols included in the time domain resource region of the first control channel. For specific content, refer to the descriptions in step 102, and no details are repeated herein.

The system information may be most essential system information used for initial access, for example, a master information block in LTE, or is referred to as an essential system information block, a system information block, or the like in a next generation system. The initial access information may include a random access response, a Message4, or the like. The Message4 may be an RRC establishment or re-establishment command sent by an access network device to a terminal in LTE.

For details of the foregoing content, refer to the descriptions in step 102, and no details are repeated herein.

Optionally, the indication information indicates a quantity of symbols occupied by the first control channel that is transmitted in a slot in which the indication information is sent.

For example, the indication information includes K bits, and different values of the K bits included in the indication information correspond to different subcarrier widths and different symbol quantities.

For other content of the indication information, refer to the descriptions in step 103, and no details are repeated herein.

Optionally, the indication information indicates a quantity of symbols occupied by the first control channel that is transmitted in an $M^{th}$ slot after the slot in which the indication information is sent, where M is a positive integer greater than or equal to 1.

Optionally, the indication information indicates a quantity of symbols occupied by the first control channel that is transmitted in each of N consecutive slots starting from a $P^{th}$ slot after a slot in which the indication information is sent, where P and N are positive integers greater than 1.

Optionally, the indication information is in a first slot of a subframe in which the indication information is sent. The indication information indicates a time-frequency resource, used to transmit the first control channel, in each slot included in the subframe.

Optionally, the transceiver unit 902 is further configured to:

send control information by using the time-frequency resource used to transmit the first control channel.

The control information is used to indicate a subcarrier width used for a second control channel, or the control information is used to indicate information about a subcarrier width for a data channel of a second control channel.

Optionally, the control information further indicates a time domain resource region occupied by the second control channel.

Figure 10:
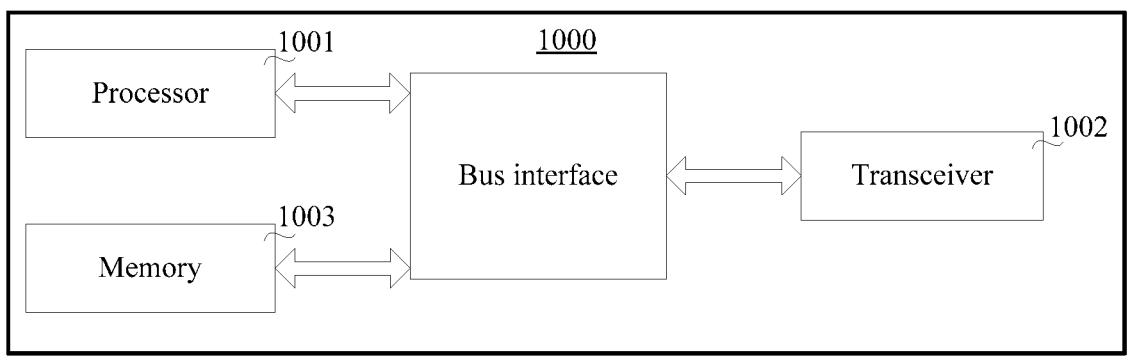
FIG. 10 is a schematic structural diagram of an access network device according to an embodiment of this application.

It should be understood that division of the foregoing units is merely logical function division. During actual implementation, all or some of the units may be integrated into one physical entity, or may be physically separate. In this embodiment of this application, the transceiver unit 902 may be implemented by a transceiver, or the processing unit 901 may be implemented by a processor. As shown in FIG. 10, an access network device 1000 may include a processor 1001, a transceiver 1002, and a memory 1003. The memory 1003 may be configured to store a program/code preinstalled on the access network device 1000 before delivery, or may store code or the like to be executed by the processor 1001.

It should be understood that the access network device 1000 according to this embodiment of this application may be corresponding to the access network device in the resource configuration method in the foregoing embodiment of this application and the access network device 1000 in this embodiment of this application, and the foregoing or other operations and/or functions of the units of the access network device 1000 are respectively used to implement the corresponding procedures in the method shown in FIG. 1. For brevity, no details are repeated herein.

In this embodiment of this application, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, a combination thereof. The processor may be a central processing unit (English: central processing unit, CPU for short), a network processor (English: network processor, NP for short), or a combination of a CPU and an NP. The processor may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field-programmable logic gate array (English: field-programmable gate array, FPGA for short), a generic array logic (English: generic array logic, GAL for short), or any combination thereof. The memory may include a volatile memory (English: volatile memory), such as a random-access memory (English: random-access memory, RAM for short); or the memory may include a non-volatile memory (English: non-volatile memory), such as a read-only memory (English: read-only memory, ROM for short), a flash memory (English: flash memory), a hard disk drive (English: hard disk drive, HDD for short), or a solid-state drive (English: solid-state drive, SSD for short); or the memory may include a combination of memories of the foregoing categories.

In FIG. 8 and FIG. 10, a bus interface may be further included. The bus interface may include any quantity of interconnected buses and bridges that are specifically connected together by circuits that are of one or more processors represented by the processor and of a memory represented by the memory. The bus interface may further connect together various other circuits such as a peripheral device, a voltage stabilizer, and a power management circuit. These are well known in the art, and therefore are not further described in this specification any more. The bus interface provides an interface. The transceiver provides a unit that communicates with various other devices on a transmission medium. The processor is responsible for management of a bus architecture and general processing, and the memory may store data that is used by the processor during an operation.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although preferred embodiments of this application have been described, persons skilled in the art can make changes and modifications to these embodiments once they learn of the basic inventive concept. Therefore, the following claims are intended to be construed as to cover the preferred embodiments and all changes and modifications falling within the scope of this application.

Obviously, persons skilled in the art can make various modifications and variations to this application without departing from the scope of this application. This application is intended to cover these modifications and variations to this application provided that they fall within the scope of protection defined by the following claims.

What is claimed is:

1. A resource configuration method, comprising:
receiving, by a terminal, indication information, wherein the indication information indicates at least one of a first subcarrier width or a second subcarrier width used for a first control channel, and wherein a first maximum quantity of symbols occupied by the first control channel corresponds to the first subcarrier width, a second maximum quantity of symbols occupied by the first control channel corresponds to the second subcarrier width, a ratio of the first maximum quantity of symbols over the second maximum quantity of symbols is equal to a ratio of the first subcarrier width over the second subcarrier width, and the first subcarrier width is different from the second subcarrier width; and
determining, by the terminal based on the indication information, a quantity of symbols occupied by the first control channel, wherein the quantity of symbols occupied by the first control channel is less than or equal to at least one of the first or the second maximum quantity of symbols, wherein the determining, by the terminal based on the indication information, the quantity of symbols occupied by the first control channel comprises:
determining, by the terminal based on indication information in an AP slot after a slot in which the indication information is received, a quantity of symbols occupied in the $M^{th}$ slot by the first control channel, wherein M is a positive integer greater than or equal to 1, or
determining, by the terminal based on indication information in N consecutive slots starting from a $P^{th}$ slot after a slot in which the indication information is received, a quantity of symbols occupied in each of the N slots by the first control channel, wherein P and N are positive integers greater than 1.

2. The method according to claim 1, wherein the quantity of symbols occupied by the first control channel is less than or equal to a maximum quantity of symbols comprised in a time domain resource region of the first control channel; and the time domain resource region is predefined or indicated by at least one of system information, higher-layer signaling, or initial access information.

3. The method according to claim 1, wherein the determining, by the terminal based on the indication information, the quantity of symbols occupied by the first control channel comprises:
 determining, by the terminal based on the first or the second subcarrier width, the first or the second maximum quantity of symbols comprised in a time domain resource region; and
 determining, by the terminal, the first or the second maximum quantity of symbols comprised in the time domain resource region, as the quantity of symbols occupied by the first control channel.

4. The method according to claim 1, wherein the indication information further indicates the quantity of symbols occupied by the first control channel.

5. The method according to claim 4, wherein the indication information and the first control channel are in a same slot.

6. The method according to claim 1, wherein N is a preset value, or N is determined by the terminal based on a received higher-layer signaling configuration.

7. The method according to claim 1, wherein after the determining, by the terminal based on the indication information, a quantity of symbols occupied by the first control channel, the method further comprises:
 obtaining, by the terminal, control information on the first control channel, wherein the control information indicates a subcarrier width used for a second control channel; and
 determining, by the terminal based on the control information, a quantity of symbols occupied by the second control channel.

8. The method according to claim 7, wherein the control information further indicates a time domain resource region occupied by the second control channel; and
 the determining, by the terminal based on the control information, a quantity of symbols occupied by the second control channel comprises:
  determining, by the terminal based on the subcarrier width used for the second control channel, a maximum quantity of symbols comprised in the time domain resource region occupied by the second control channel; and
  determining, by the terminal, the maximum quantity of symbols comprised in the time domain resource region occupied by the second control channel, as the quantity of symbols occupied by the second control channel.

9. The method according to claim 1, wherein after the determining, by the terminal based on the indication information, a quantity of symbols occupied by the first control channel, the method further comprises:
 obtaining, by the terminal, control information on the first control channel, wherein the control information indicates information about a subcarrier width used for a data channel of a second control channel;
 determining, by the terminal based on the subcarrier width used for the data channel, a subcarrier width used for the second control channel; and
 determining, by the terminal based on the subcarrier width used for the second control channel, a quantity of symbols occupied by the second control channel.

10. A resource configuration method, comprising:
 generating, by an access network device, indication information, wherein the indication information indicates at least one of a first subcarrier width or a second subcarrier width used for a first control channel, and wherein a first maximum quantity of symbols occupied by the first control channel corresponds to the first subcarrier width, a second maximum quantity of symbols occupied by the first control channel corresponds to the second subcarrier width a ratio of the first maximum quantity of symbols over the second maximum quantity of symbols is equal to a ratio of the first subcarrier width over the second subcarrier width, and the first subcarrier width is different from the second subcarrier width, and wherein at least one of the following occurs:
  indication information that is transmitted in an $M^{th}$ slot after a slot in which the indication information is sent indicates a quantity of symbols occupied in the $M^{th}$ slot by the first control channel, wherein M is a positive integer greater than or equal to 1; or
  indication information that is transmitted in each of N consecutive slots starting from a $P^{th}$ slot after a slot in which the indication information is sent indicates a quantity of symbols occupied in each of the N slots by the first control channel, wherein P and N are positive integers greater than 1; and
 sending, by the access network device, the indication information to a terminal.

11. The method according to claim 10, wherein the quantity of symbols occupied by the first control channel is less than or equal to a maximum quantity of symbols comprised in a time domain resource region of the first control channel, and the time domain resource region is predefined or indicated by at least one of system information, higher-layer signaling, or initial access information.

12. The method according to claim 10, wherein the indication information indicates a quantity of symbols occupied by the first control channel that is transmitted in a slot in which the indication information is sent.

13. The method according to claim 10, wherein the indication information is in a first slot of a subframe in which the indication information is sent; and
 the indication information indicates a time-frequency resource, used to transmit the first control channel, in each slot comprised in the subframe.

14. A resource configuration apparatus, comprising:
 a transceiver, configured to receive indication information, wherein the indication information indicates at least one of a first subcarrier width or a second subcarrier width used for a first control channel, and wherein a first maximum quantity of symbols occupied by the first control channel corresponds to the first subcarrier width, a second maximum quantity of symbols occupied by the first control channel corresponds to the second subcarrier width, a ratio of the first maximum quantity of symbols over the second maximum quantity of symbols is equal to a ratio of the first subcarrier width over the second subcarrier width, and the first subcarrier width is different from the second subcarrier width;
 a non-transitory memory storage comprising instructions; and
 one or more hardware processors in communication with the non-transitory memory storage, wherein the one or more hardware processors execute the instructions to:
  determine, based on the indication information, a quantity of symbols occupied by the first control channel, wherein the quantity of symbols occupied by the first control channel is less than or equal at least one of the first or the second maximum quantity of symbols, wherein the one or more hardware processors execute the instructions to:

determine, based on indication information in an $M^{th}$ slot after a slot in which the indication information is received, a quantity of symbols occupied in the $M^{th}$ slot by the first control channel, wherein M is a positive integer greater than or equal to 1; or determine, based on indication information in N consecutive slots starting from a $P^{th}$ slot after a slot in which the indication information is received, a quantity of symbols occupied in each of the N slots by the first control channel, wherein P and N are positive integers greater than 1.

\* \* \* \* \*